United States Patent

Okubo

(10) Patent No.: US 9,261,948 B2
(45) Date of Patent: Feb. 16, 2016

(54) IMAGE FORMING APPARATUS AND CONTROL METHOD FOR EXECUTING A PROXY IN RESPONSE TO A HEARTBEAT

(71) Applicant: CANON KABUSHIKI KAISHA, Tokyo (JP)

(72) Inventor: Yuzuru Okubo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 13/741,303

(22) Filed: Jan. 14, 2013

(65) Prior Publication Data

US 2013/0185573 A1    Jul. 18, 2013

(30) Foreign Application Priority Data

Jan. 16, 2012    (JP) .................................. 2012-006206

(51) Int. Cl.
*G06F 1/32*    (2006.01)

(52) U.S. Cl.
CPC ............ *G06F 1/3296* (2013.01); *G06F 1/3209* (2013.01); *G06F 1/3284* (2013.01); *Y02B 60/1267* (2013.01); *Y02B 60/32* (2013.01)

(58) Field of Classification Search
CPC .... G06F 1/3206; G06F 1/3209; G06F 1/3296
USPC ............................................... 713/3, 320, 323
See application file for complete search history.

(56) References Cited

U.S. PATENT DOCUMENTS

| | | | | |
|---|---|---|---|---|
| 5,333,273 | A * | 7/1994 | Raasch et al. | 710/67 |
| 6,493,824 | B1 * | 12/2002 | Novoa et al. | 713/162 |
| 8,417,976 | B2 * | 4/2013 | Inoue | 713/320 |
| 2009/0060177 | A1 * | 3/2009 | Aaron et al. | 380/42 |
| 2010/0235500 | A1 * | 9/2010 | Shizuno | 709/224 |
| 2010/0235639 | A1 * | 9/2010 | Inoue | 713/168 |
| 2011/0078464 | A1 * | 3/2011 | Yokomizo | 713/300 |

FOREIGN PATENT DOCUMENTS

JP    2006-259906 A    9/2006

* cited by examiner

*Primary Examiner* — Chun Cao
(74) *Attorney, Agent, or Firm* — Canon USA, Inc. IP Division

(57) ABSTRACT

An image forming apparatus automatically recognizes and responds to an encrypted heartbeat packet only with a small amount of calculation, without causing a sub control unit to execute an SSL/TLS decryption process. As a result, the image forming apparatus can execute a proxy response with less power consumption.

5 Claims, 10 Drawing Sheets

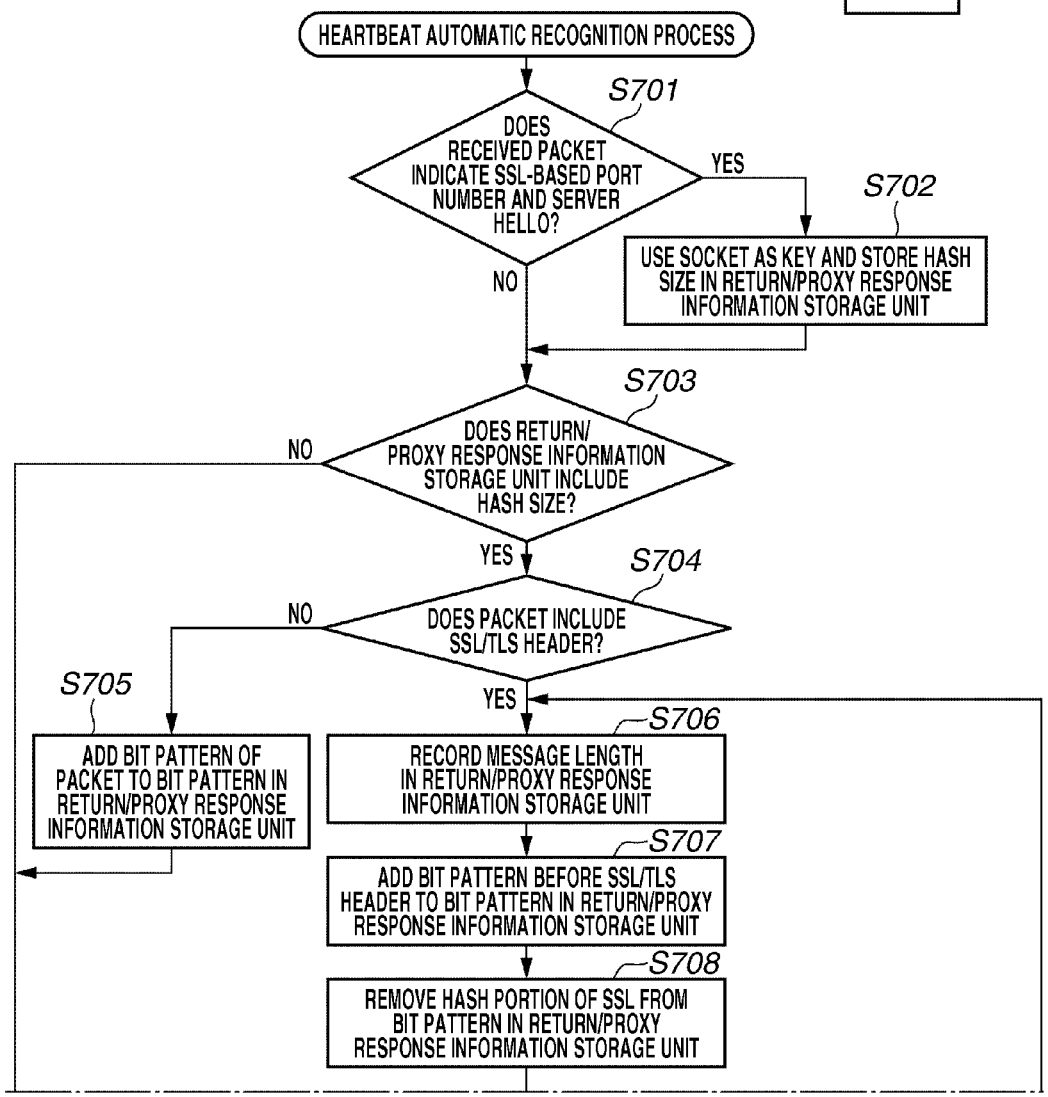

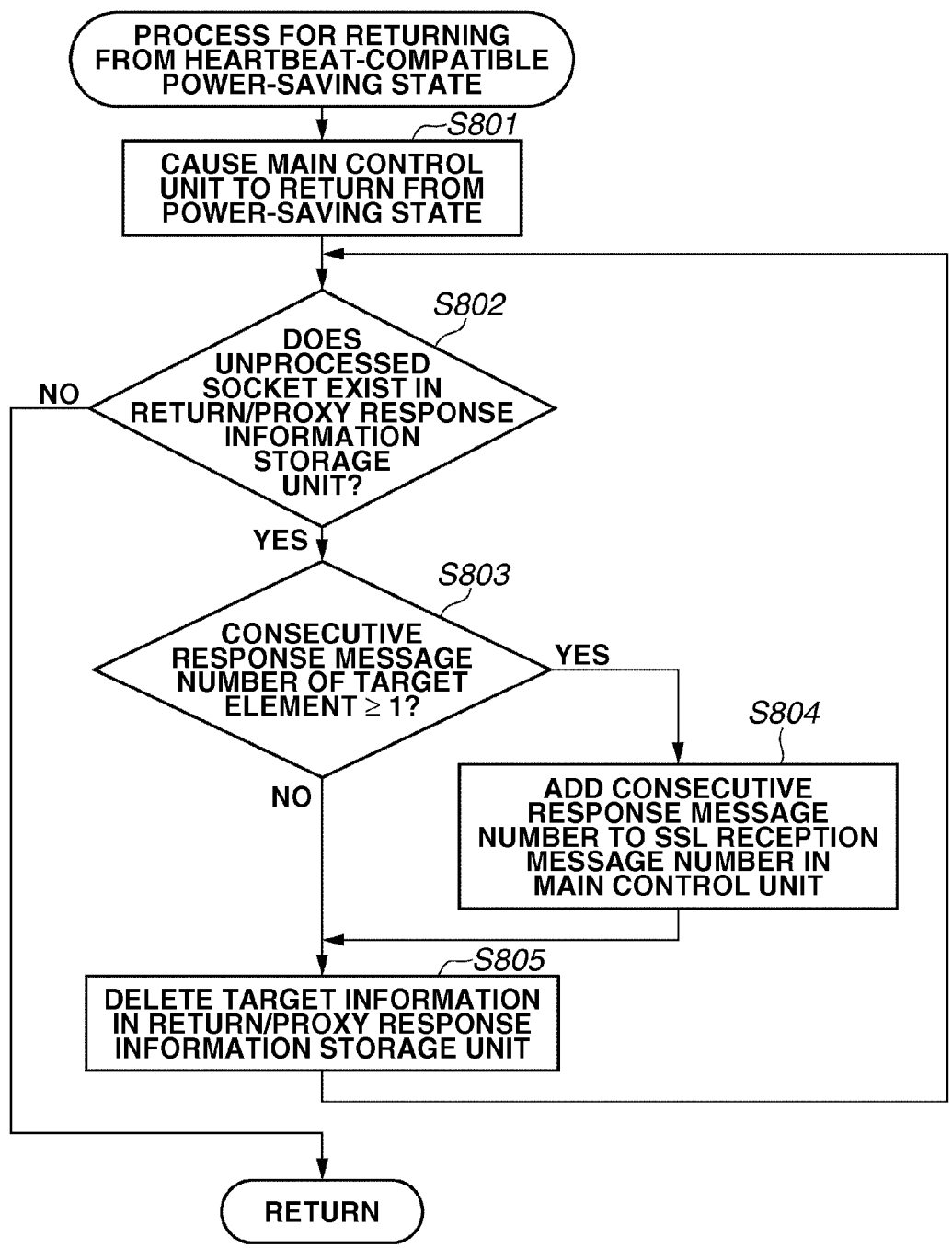

FIG.9

HASH SIZE TABLE

901

| IDENTIFIER | VALUE | HASH SIZE |
|---|---|---|
| TLS_RSA_WITH_NULL_MD5 | {0x00, 0x01} | 16 |
| TLS_RSA_WITH_NULL_SHA | {0x00, 0x02} | 20 |
| TLS_RSA_EXPORT_WITH_RC4_40_MD5 | {0x00, 0x03} | 16 |
| TLS_RSA_WITH_RC4_128_MD5 | {0x00, 0x04} | 16 |
| TLS_RSA_WITH_RC4_128_SHA | {0x00, 0x05} | 20 |
| TLS_RSA_EXPORT_WITH_RC2_CBC_40_MD5 | {0x00, 0x06} | 16 |
| TLS_RSA_WITH_IDEA_CBC_SHA | {0x00, 0x07} | 20 |
| TLS_RSA_EXPOTRT_WITH_DES40_CBC_SHA | {0x00, 0x08} | 20 |
| TLS_RSA_WITH_DES_CBC_SHA | {0x00, 0x09} | 20 |
| TLS_RSA_WITH_3DES_EDE_CBC_SHA | {0x00, 0x0A} | 20 |
| ... | ... | ... |

IMAGE FORMING APPARATUS AND CONTROL METHOD FOR EXECUTING A PROXY IN RESPONSE TO A HEARTBEAT

BACKGROUND OF THE INVENTION

1. Field of the Invention

The present invention relates to an image forming apparatus, a control method for the same, and a program for the same.

2. Description of the Related Art

In recent years, as an effort to address environmental issues, power saving in image forming apparatuses, such as printers and multifunction peripherals, has become widespread.

In a common method for realizing such power saving, if no print job is input to an image forming apparatus via a control panel thereof or via a network for a certain period of time, the image forming apparatus is shifted to a power-saving state to reduce power consumption.

However, there is also known a packet referred to as a heartbeat. A heartbeat is transmitted at certain intervals to maintain connection, and a receiving-end application does not need to reply to or calculate the heartbeat. A technique for processing a packet processable in a power-saving state such as the heartbeat without returning from the power-saving state is referred to as a proxy response.

Japanese Patent Application Laid-Open No. 2006-259906 discusses a communication control apparatus having a power-saving control function for determining whether the communication control apparatus needs to return to a non-power-saving state in response to a packet processable in a power-saving state.

In addition, transmission of a packet encrypted by secure sockets layer (SSL)/transport layer security (TLS) is known.

If a packet encrypted by SSL/TLS is applied to the technique discussed in Japanese Patent Application Laid-Open No. 2006-259906, it is assumed that the communication control apparatus executes a decryption process when in the power-saving state. However, decryption of data encrypted by SSL/TLS requires a high calculation cost. For the decryption, a high-speed processing unit needs to be provided for a sub control unit that operates in the power-saving state. Since such high-speed processing unit requires large power consumption, the merit of shifting to the power-saving state is impaired.

SUMMARY OF THE INVENTION

The present invention is directed to an image forming apparatus capable of executing a proxy response in response to a heartbeat encrypted by SSL/TLS and to a process requiring a similar function, without executing a decryption process.

According to an aspect of the present invention, an image forming apparatus includes a main control unit configured to control an image forming processing unit configured to execute an image forming process, and a sub control unit configured to exchange data with an information processing apparatus via a network. The main control unit includes a power-saving control unit configured to shift the main control unit to a power-saving state, in which power supply to the image forming processing unit is reduced. The sub control unit includes a determination unit configured to determine, if an encryption communication protocol is used for exchanging messages and a message is transmitted from the information processing apparatus, whether the main control unit needs to be shifted to a non-power-saving state from the power-saving state based on a bit pattern of the message, without executing a decryption process on the message. In addition, the sub control unit includes a return unit configured to give, if the determination unit determines that the main control unit needs to be shifted to the non-power-saving state, a return instruction for shifting the main control unit to the non-power-saving state, to cause the main control unit to transmit information in response to the message to the information processing apparatus. In addition, the sub control unit includes a response unit configured to transmit, if the determination unit determines that the main control unit does not need to be shifted to the non-power-saving state, information in response to the transmitted message to the information processing apparatus, without giving the return instruction for shifting the main control unit to the non-power-saving state.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 is a flow chart illustrating a process for returning from a heartbeat-compatible power-saving state.

FIG. 9 illustrates an example of a hash size table stored in a sub control unit.

DESCRIPTION OF THE EMBODIMENTS

Various exemplary embodiments, features, and aspects of the invention will be described in detail below with reference to the drawings.

Figure 1:
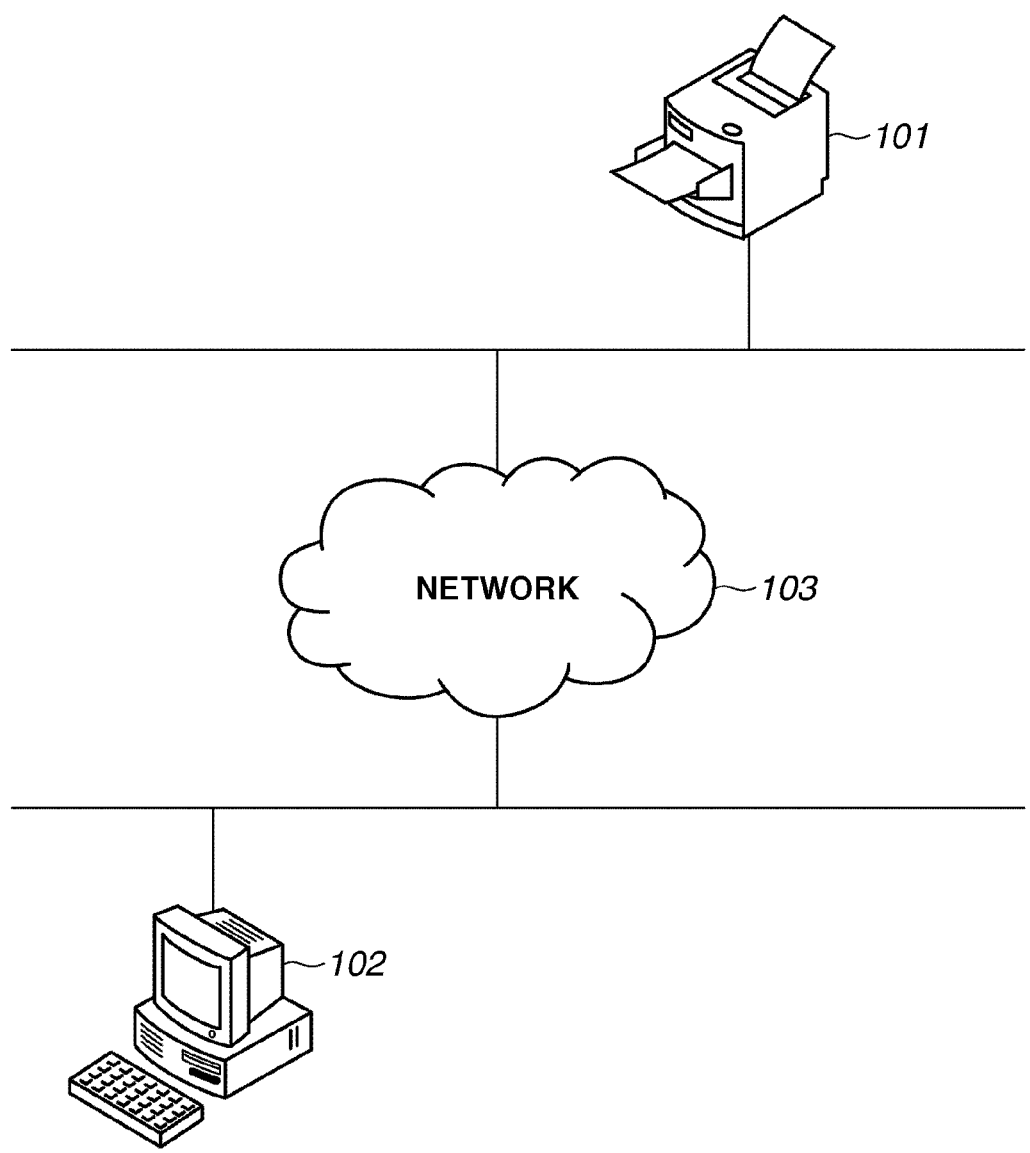
FIG. 1 illustrates a configuration of a network system including an image forming apparatus.

FIG. 1 illustrates a configuration of a network system including an image forming apparatus 101 according to an exemplary embodiment of the present invention. The image forming apparatus 101 is connected to a host computer 102 via a network 103. The image forming apparatus 101 and the host computer 102 can communicate with each other. The type of the network 103 is not particularly limited, as long as the network 103 enables a mutual communication between the image forming apparatus 101 and the host computer 102. Examples of the network 103 include a local area network (LAN) and the Internet. Alternatively, the image forming apparatus 101 and the host computer 102 may be connected directly to each other, instead of via the network 103.

Figure 2:
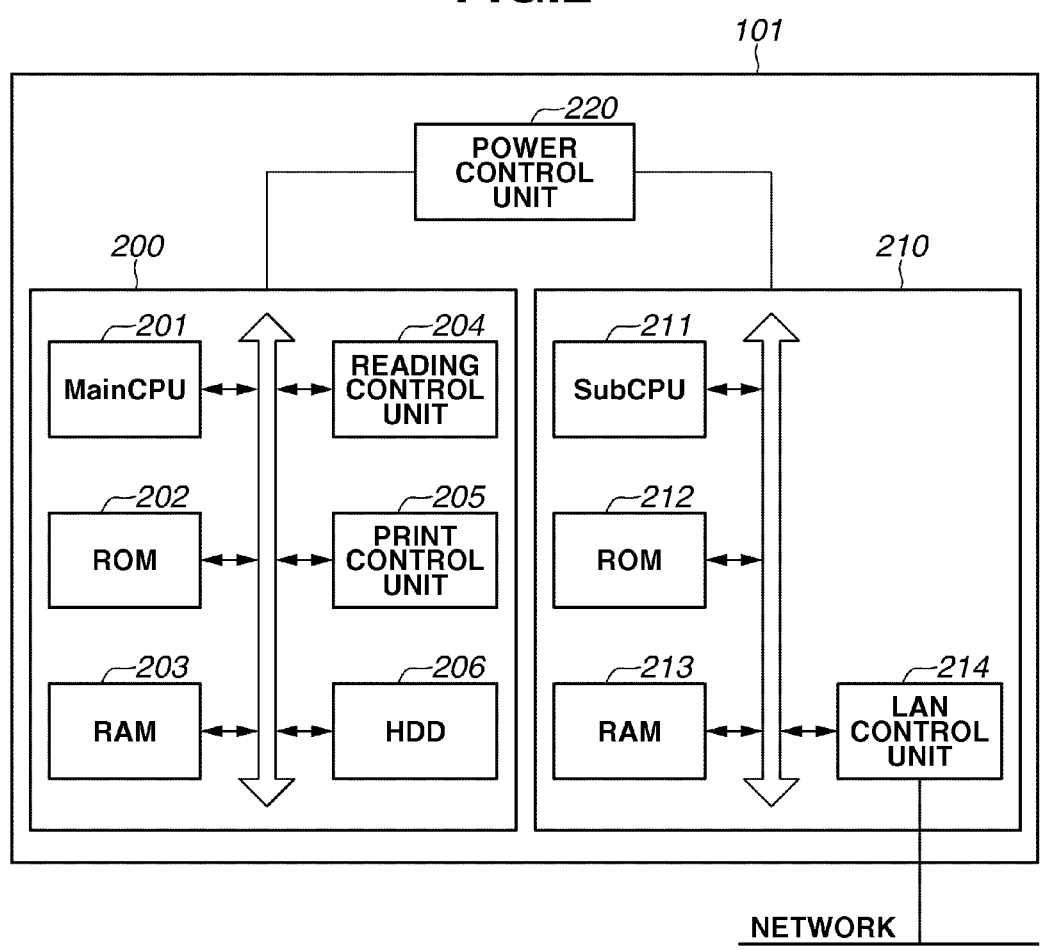
FIG. 2 is a block diagram illustrating a hardware configuration of the image forming apparatus.

FIG. 2 is a block diagram illustrating a hardware configuration of the image forming apparatus 101. The image forming apparatus 101 includes a main control unit 200 controlled by a Main CPU 201 and a sub control unit 210 controlled by a Sub CPU 211, and the main control unit 200 and the sub control unit 210 are connected to each other by a peripheral component interconnect (PCI) bus. The main control unit 200 controls a reading control unit 204 and a print control unit 205 to realize copying and printing functions of the image forming apparatus 101. Programs for controlling these functions and shifting to a power-saving state are stored in a read-only memory (ROM) 202 or a hard disk drive (HDD) 206. When the image forming apparatus 101 is activated, these programs are read to a random access memory (RAM) 203 and are executed by the Main CPU 201. After being shifted to the power-saving state, the image forming apparatus 101 stops supplying power to various units, in accordance with the program for controlling shifting to the power-saving state. For example, the image forming apparatus 101 stops supplying power to the reading control unit 204 and/or the print control unit 205. This state in which the power consumption is reduced by supplying power to only the minimum necessary units will be referred to as a power-saving state. In contrast, a state in which the functions of the image forming apparatus 101 can be used will be referred to as a normal state or a non-power-saving state.

The sub control unit 210 exchanges network packets via a LAN control unit 214. After the image forming apparatus 101 is shifted to the power-saving state, the LAN control unit 214 controls an operation for causing the image forming apparatus 101 to return to the non-power-saving state. A program controlling these functions is stored in a ROM 212. The program is read to a RAM 213 and is executed by the Sub CPU 211 when the image forming apparatus 101 is activated. When the image forming apparatus 101 is shifted from the non-power-saving state to the power-saving state, information about conditions for returning from the power-saving state is transmitted from the main control unit 200 to the sub control unit 210 and is stored in a RAM 213. A power control unit 220 controls power supply to blocks of the image forming apparatus 101. Particularly, by stopping power supply to the main control unit 200 and shifting the image forming apparatus 101 to the power-saving state, the power control unit 220 can reduce the overall power consumption of the image forming apparatus 101. The blocks of the image forming apparatus 101 include the control units that are included in the main control unit 200 and that control units executing an image forming process. By reducing power supply to these control units, power supply to the units executing an image forming process can be reduced.

Figure 3:
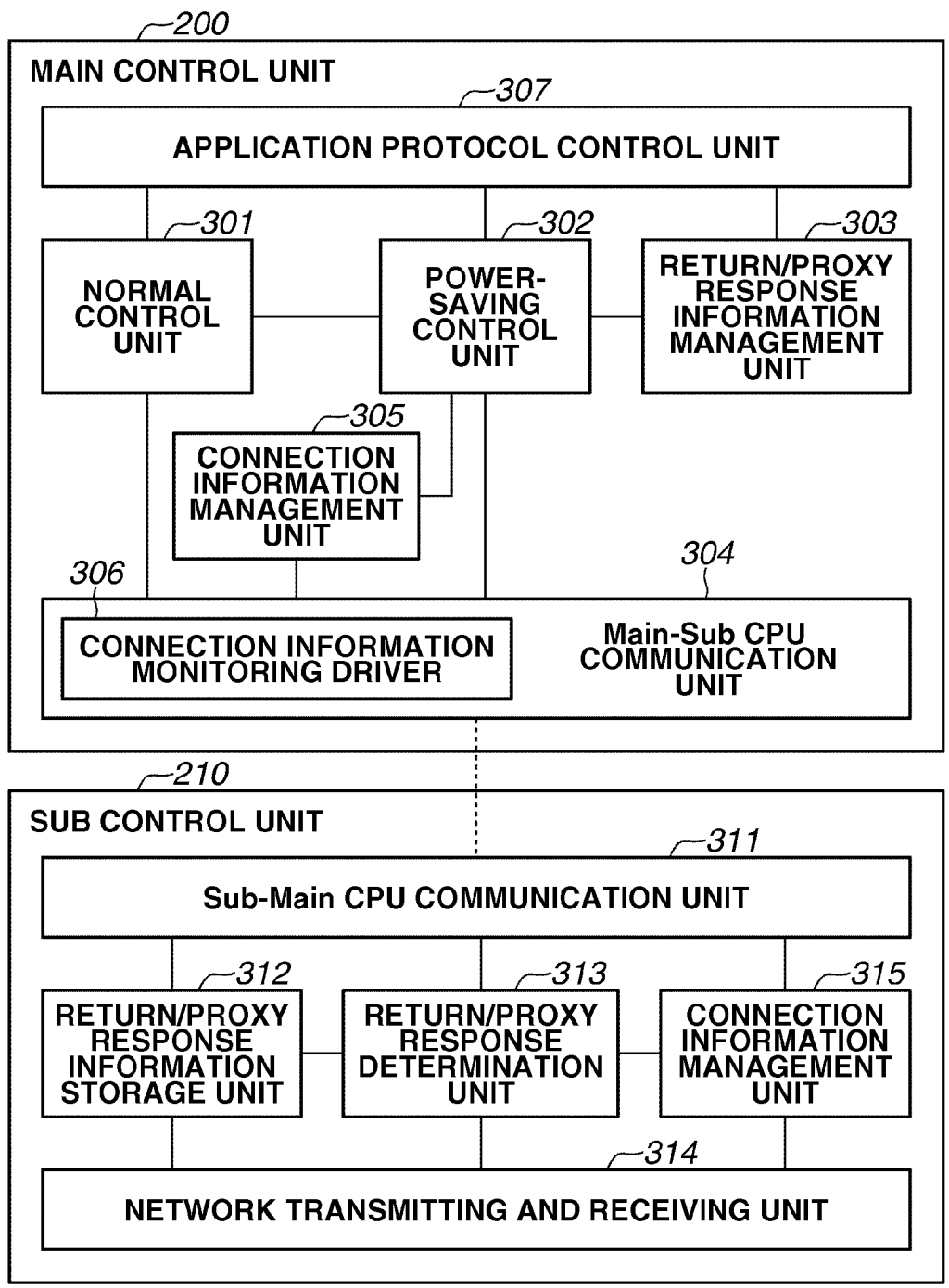
FIG. 3 is a block diagram illustrating a software configuration of the image forming apparatus.

FIG. 3 is a block diagram illustrating a software configuration of the image forming apparatus 101. First, a software configuration of the main control unit 200 will be described with reference to FIG. 3. All the blocks are executed by the Main CPU 201 in a parallel way.

A normal control unit 301 controls various operations, as an image forming apparatus during a non-power-saving operation. A return/proxy response information management unit 303 stores information about conditions for returning to the normal state, that is, returning from the power-saving state to the non-power-saving state, and conditions for executing a proxy response in the power-saving state. After a power-saving control unit 302 acquires condition information stored in the return/proxy response information management unit 303 or connection management information stored in a connection information management unit 305 and transmits such information to a Main-Sub CPU communication unit 304, the power-saving control unit 302 instructs the power control unit 220 to shift the image forming apparatus 101 to the power-saving state. The Main-Sub CPU communication unit 304 communicates with a Sub-Main communication unit 311 and exchanges information with the sub control unit 210. A connection information monitoring driver 306 monitors communication packets transferred from the sub control unit 210 via a network transmitting and receiving unit 314, acquires connection information from a connection information management unit 315, and stores the connection information in the connection information management unit 305.

The connection information management unit 305 receives connection information per communication connection from the connection information monitoring driver 306 and stores the information. An application protocol control unit 307 operates on the image forming apparatus 101 in the non-power-saving state. When the image forming apparatus 101 receives various packets from clients, the application protocol control unit 307 acquires data per application via the normal control unit 301. In addition, the application protocol control unit 307 receives notification of shifting from the non-power-saving state to the power-saving state via the power-saving control unit 302. In this way, the application protocol control unit 307 can recognize shifting from the non-power-saving state to the power-saving state. In addition, after the image forming apparatus 101 is shifted to the power-saving state, the application protocol control unit 307 sets conditions for returning to the non-power-saving state or conditions for executing the proxy response in the return/proxy response information management unit 303. Next, a software configuration of the sub control unit 210 will be described with reference to FIG. 3. All the blocks are executed by the Sub CPU 211 in a parallel way. The Sub-Main CPU communication unit 311 communicates with the Main-Sub communication CPU unit 304 and exchanges information with the main control unit 200. A return/proxy response information storage unit 312 receives return/proxy response condition information stored in the return/proxy response information management unit 303 via the Sub-Main CPU communication unit 311 and stores the information. The connection information management unit 315 receives connection management information stored in the connection information management unit 305 via the Sub-Main CPU communication unit 311 and stores the information. A return/proxy response determination unit 313 analyzes a packet received from the network transmitting and receiving unit 314. Then, the return/proxy response determination unit 313 uses information stored in the return/proxy response information storage unit 312 and information stored in the connection information management unit 315, to determine whether to cause the image forming apparatus 101 to return to the non-power-saving state, whether to maintain the power-saving state and execute the proxy response, or whether to leave the packet unprocessed. In the non-power-saving state, packets received by the network transmitting and receiving unit 314 are transferred directly to the main control unit 200 via the Sub-Main CPU communication unit 311. However, in the power-saving state, packets received by the network transmitting and receiving unit 314 are transferred to the return/proxy response determination unit 313.

Figure 4:
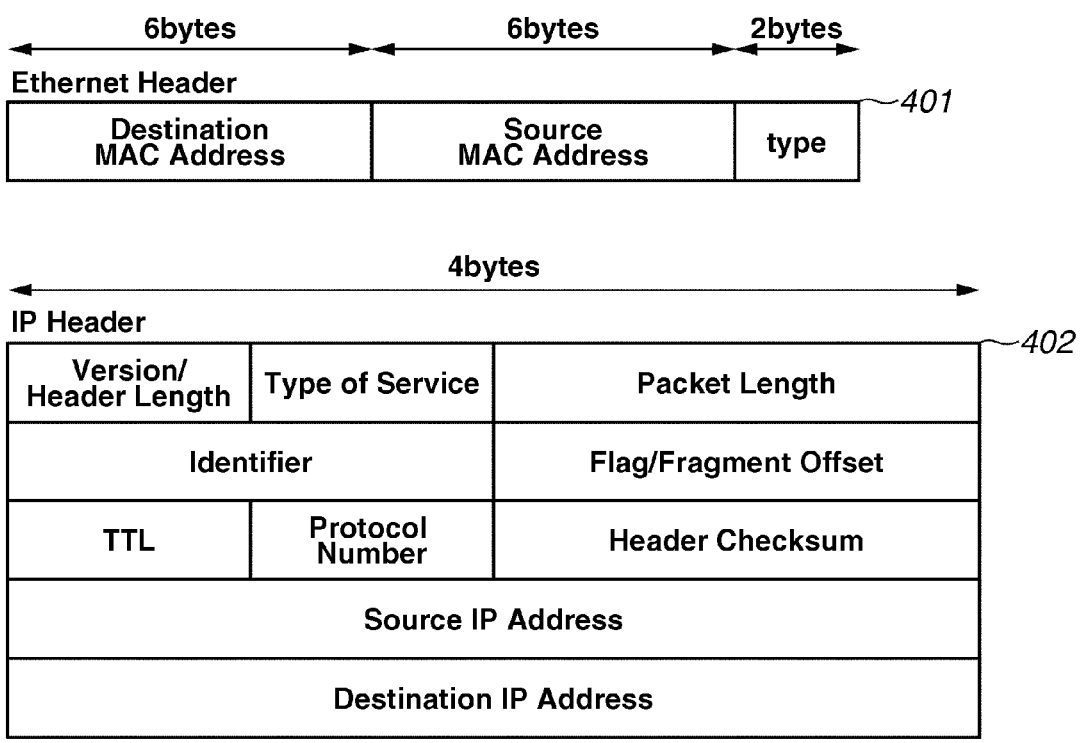
FIG. 4 illustrates a format of an IP packet.

FIG. 4 illustrates a packet format used in a communication. A communication packet includes an Ether header 401 and an IP header 402 subsequent thereto. Examples of a general packet requiring connection include a transmission control protocol (TCP) packet. A TCP packet includes a TCP packet header subsequent to the Ether header 401 and the IP header 402. A TCP packet will be described below in detail with reference to FIG. 5, while the TCP specification is defined in Request For Comments (RFC) 793.

Figure 5:
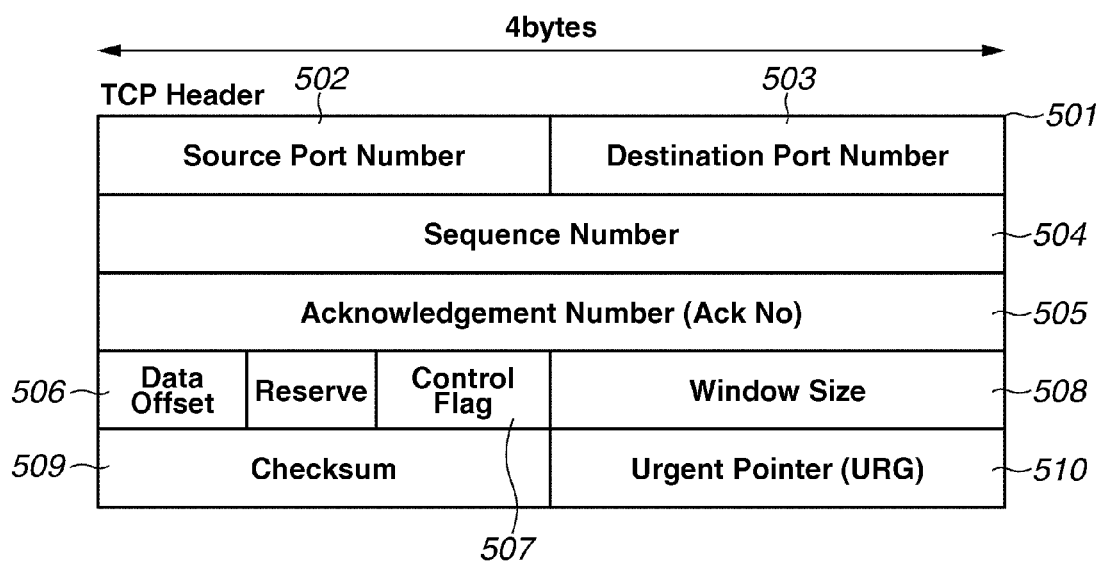
FIG. 5 illustrates a format of a TCP packet.

FIG. 5 illustrates a format of a TCP packet used in a communication requiring connection. Generally, a TCP header 501 is present in the communication requiring connection. Management of connection is executed by using information included in the TCP header 501. Management of connection refers to control operations that are executed to ensure reliability of a communication, such as a control operation for the sequence of communication packets exchanged in the connection, for retransmission executed in a case of packet loss, for a packet flow amount, and for avoiding congestion. A 2-byte source port number 502 indicates a port number of a node from which a communication packet is transmitted. A 2-byte destination port number 503 indicates a port number of a node receiving the communication packet. If the communication requiring connection is executed, unless the connection is closed or changed, the source port number 502 and the destination port number 503 indicate fixed values. A 4-byte sequence number 504 indicates the position of the transmitted packet data. Each time data is transmitted, a value is added by the size of the transmitted data. A 4-byte acknowledgement number (Ack No) 505 indicates the sequence number of the next data to be received. Thus, if the sequence number 504 of the next packet to be transmitted by the transmitting node matches the acknowledgement number 505 of the packet to be received, the communication until then is deemed as successful.

A 4-bit data offset 506 indicates where a data portion field starts in a TCP packet. A 6-bit control flag 507 indicates TCP packet control information. In the control flag 507, flag types URG, ACK, PSH, RST, SYN, and FIN are set for the respective bits. The flag type URG indicates that urgent data is included, and the flag type ACK indicates that the value of the acknowledgement number 505 is valid. The flag type PSH indicates that received data needs to be transferred to an upper application protocol, and the flag type RST indicates that the connection is terminated forcibly for some reason. The flag type SYN indicates a request for establishment of connection, and the flag type FIN indicates that there is no data to be transmitted, namely, a request for termination of the connection. If a communication requiring connection is executed, the connection is managed by controlling the control flag 507 for each communication sequence. A 2-byte window size 508 indicates the next receivable data size from a data position indicated by the value of the acknowledgement number 505. The transmitting node cannot transmit a data with size exceeding the value of the window size 508.

The value of the window size 508 dynamically varies per communication sequence, depending on a state of a packet to be processed by the receiving node, a size of a reception buffer prepared in the receiving node, or a setting of a protocol stack of the receiving node. A 2-byte checksum 509 provides reliability of the header and the data portions in the TCP packet. The transmitting node calculates a checksum 509 for each packet and adds the checksum 509 to the packet corresponding thereto. The receiving node can check whether the packet is destroyed along a communication path by checking the checksum 509 of the received packet. A 2-byte urgent pointer (URG) 510 indicates a storage location pointer of urgent data. When the urgent data is received, each application of the receiving node determines an operation to be executed.

Figure 6:
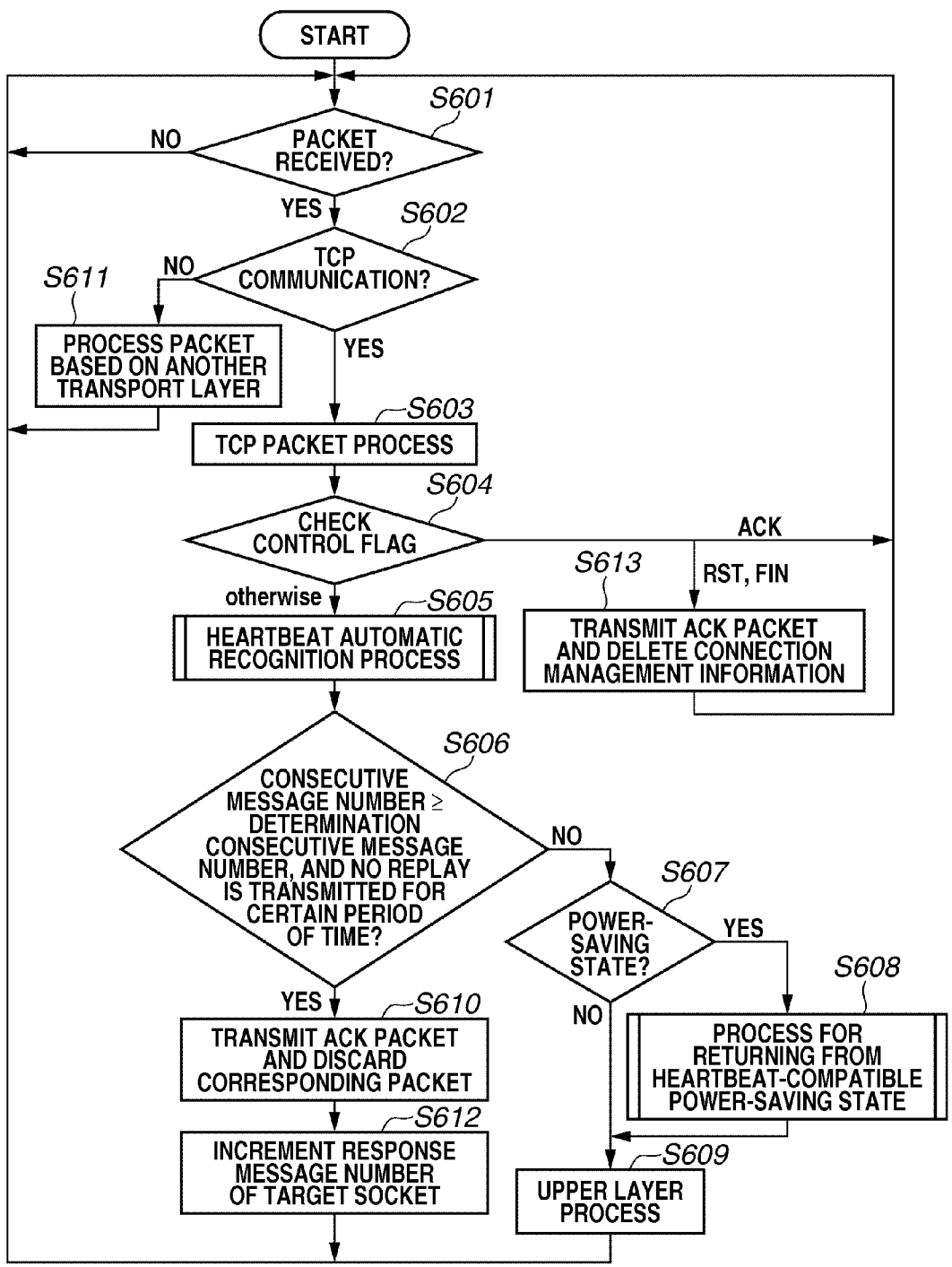
FIG. 6 is a flow chart illustrating an operation executed by a sub central processing unit (CPU).

FIG. 6 is a flow chart illustrating an operation executed by the sub control unit 210. In step S601, the network transmitting and receiving unit 314 monitors reception of a packet from a node via a network. If the network transmitting and receiving unit 314 receives a packet (YES in step S601), the operation proceeds to step S602. In step S602, the network transmitting and receiving unit 314 checks whether the packet is transmitted through a TCP communication, based on the source/destination MAC address, the source/destination IP address, the source/destination port number, and the protocol number in the received packet. If the packet is not transmitted through a TCP communication (NO in step S602), the operation proceeds to step S611. In step S611, the network transmitting and receiving unit 314 processes the packet based on another transport layer such as a user datagram protocol (UDP). If the packet is transmitted through a TCP communication (YES in step S602), the operation proceeds to step S603. In step S603, the network transmitting and receiving unit 314 determines whether the packet is destroyed along a communication path by calculating the checksum 509 and checks validity of the TCP packet. In addition, if the control flag of the received TCP packet indicates other than SYN, the network transmitting and receiving unit 314 acquires the sequence number 504 and the acknowledgement number 505 of the received packet.

In addition, the network transmitting and receiving unit 314 acquires the sequence number 504 and the acknowledgement number 505 from the connection information management unit 315. Next, the network transmitting and receiving unit 314 checks whether the sequence is correct based on the sequence numbers 504 and the acknowledgement numbers 505 acquired from both the received packet and the connection information management unit 315. Then, in step S603, if a network sequence is not determined to be correct, the network transmitting and receiving unit 314 discards the received packet and the operation returns to step S601. If a network sequence is determined to be correct, the network transmitting and receiving unit 314 searches the connection information management unit 315 for target connection management information. In step S603, if the target connection is not registered in the connection information management unit 315, the network transmitting and receiving unit 314 discards the received packet and the operation returns to step S601. If the target connection is registered, the network transmitting and receiving unit 314 acquires the target connection management information from the connection information management unit 315.

Then, in step S604, the network transmitting and receiving unit 314 checks the control flag of the packet to confirm a packet control method. If the control flag indicates ACK (ACK in step S604), the network transmitting and receiving unit 314 transmits the connection management information included in the received packet to the connection information management unit 315, and the operation returns to step S601. If the control flag indicates RST or FIN (RST and FIN in step S604), the operation proceeds to step S613. In step S613, the network transmitting and receiving unit 314 generates an ACK packet in response to the received packet and transmits the ACK packet to the transmitting node via the network. In step S613, the network transmitting and receiving unit 314 deletes the target connection management information stored in the connection information management unit 315, and the operation returns to step S601. This operation means disconnection of the target connection. In step S604, if the control flag indicates other than the above type ACK, RST, or FIN (otherwise in step S604), the operation proceeds to step S605. This series of TCP packet processes is an example of implementation. An arbitrary implementation may be applied as long as the implementation is complied with the TCP specification (RFC 793).

Figure 7B:
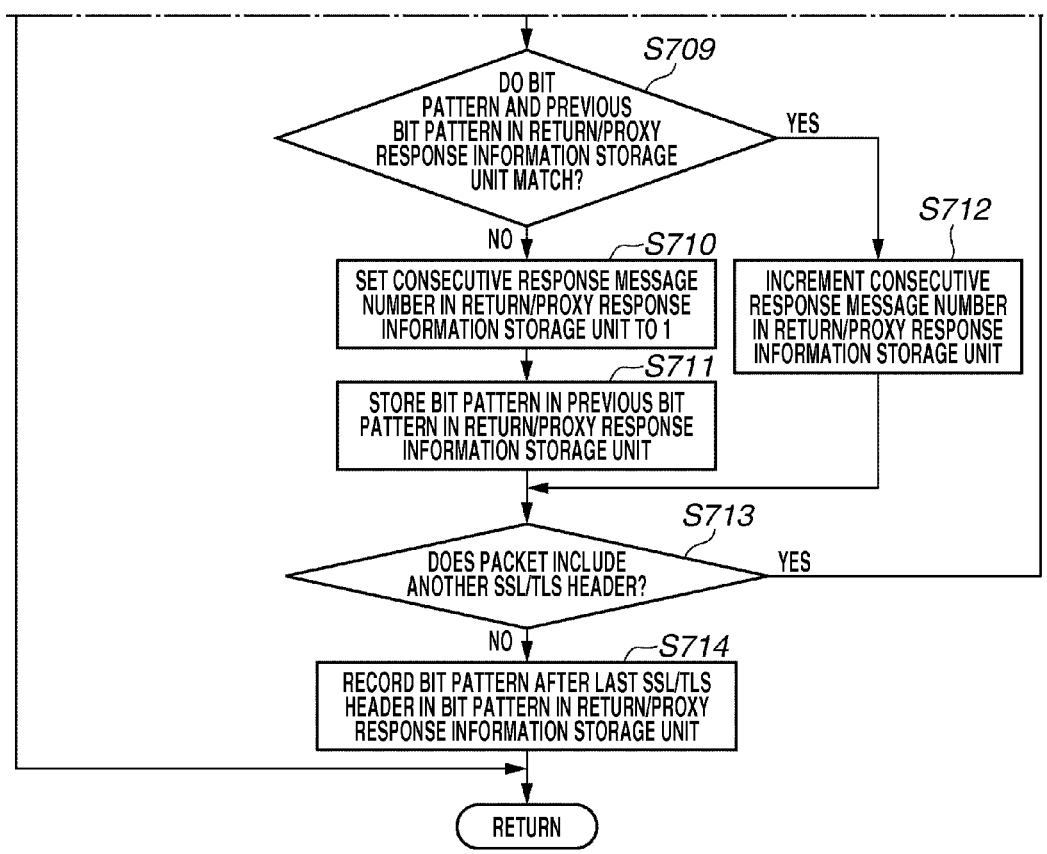
FIG. 7, which is composed of FIGS. 7A and 7B, is a flow chart illustrating a heartbeat automatic recognition process.

Next, the heartbeat automatic recognition process in step S605 will be described in detail with reference to FIG. 7, which is composed of FIGS. 7A and 7B. In step S701, the network transmitting and receiving unit 314 checks whether the source port number 502 in the received TCP packet is based on SSL. The port number based on SSL/TLS is defined to be 443 by the Internet Assigned Numbers Authority (IRNA). In addition, if mutual communication via a proxy server is assumed, the port number of the proxy server may be added. While SSL/TLS is used as an encrypted communication protocol in the first exemplary embodiment, exemplary embodiments of the present invention is not limited thereto.

After checking the port number, the network transmitting and receiving unit 314 acquires the data main body excluding the Ether header 401 and the IP header 402 of the TCP packet. The network transmitting and receiving unit 314 checks whether the received data indicates Server Hello, which is an SSL message. Namely, the network transmitting and receiving unit 314 checks whether the received packet is data that is transmitted as the first packet from an information processing apparatus to establish connection between the image forming apparatus and the information processing apparatus. If these conditions are met (YES in step S701), the operation proceeds to step S702. In step S702, the network transmitting and receiving unit 314 refers to a hash size table 901 stored in advance in the ROM 212 or the RAM 213.

FIG. 9 illustrates the hash size table 901. Identifiers in the hash size table 901 are used to determine an encryption algorithm and a hash algorithm in an initial phase in an SSL communication. Items that need to be stored in the ROM 212 or the RAM 213 are values and hash sizes. Character strings of the identifiers do not need to be stored. In addition, the storage method is not limited, as long as a hash size can be extracted from a value in the hash size table 901. The identifiers in the hash size table 901 illustrated in FIG. 9 are part of an actually-used encryption algorithm. The hash size table 901 may be extended as needed. The network transmitting and receiving unit 314 uses a socket, namely, the IP address and the port number of the receiving node, as a key and stores a hash size acquired from the hash table 901 in the return/proxy response information storage unit 312. In step S703, the network transmitting and receiving unit 314 checks whether the return/proxy response information storage unit 312 includes a hash size using the socket as a key. If the hash size is included (YES in step S703), the operation proceeds to step S704. If not (NO in step S703), the operation proceeds to RETURN.

In step S704, the network transmitting and receiving unit 314 checks whether the packet includes an SSL/TLS header. The SSL/TLS header may not always be stored in an initial part of the packet. Thus, the position of the SSL/TLS header is determined based on the message length stored in the return/proxy response information storage unit 312. If the network transmitting and receiving unit 314 determines that the packet includes the SSL/TLS header (YES in step S704), the operation proceeds to step S706. If not (NO in step S704), the operation proceeds to step S705. In step S705, the network transmitting and receiving unit 314 adds the SSL/TLS message to the return/proxy response information storage unit 312 and the operation proceeds to RETURN. In step S706, the network transmitting and receiving unit 314 records the SSL/TLS message length in the return/proxy response information storage unit 312. Then, in step S707, the network transmitting and receiving unit 314 adds a bit pattern before the SSL/TLS header to the return/proxy response information storage unit 312. If the entire bit pattern cannot be recorded because of limitations such as the storage area size of the sub control unit 210, a bit pattern having limited acquisition size may be recorded. For example, only a certain number of bytes from the initial bit may be recorded.

Then, in S708, the network transmitting and receiving unit 314 removes a hash portion from the bit pattern in the return/proxy response information storage unit 312. Namely, data corresponding to the hash size is subtracted from the bit pattern of the received message, and the remaining bit pattern is stored. In step S708, the network transmitting and receiving unit 314 refers to a hash size stored in the return/proxy response information storage unit 312. Then, in step S709, the network transmitting and receiving unit 314 compares the bit pattern with the previous bit pattern in the return/proxy response information storage unit 312. If the bit patterns match (YES in step S709), the operation proceeds to step S712. If not (NO in step S709), the operation proceeds to step S710. If no message is stored in the return/proxy response information storage unit 312, it is determined that no matching is achieved. In step S712, the network transmitting and receiving unit 314 increments the consecutive message number in the return/proxy response information storage unit 312. In this example, it is assumed that the initial value of the consecutive message number is 0. In step S710, the network transmitting and receiving unit 314 sets the value of the consecutive message number in the return/proxy response information storage unit 312 to 1. In step S711, the network transmitting and receiving unit 314 stores the bit pattern in the previous bit pattern in the return/proxy response information storage unit 312 and empties the bit pattern in the return/proxy response information storage unit 312.

Then, in step S713, the network transmitting and receiving unit 314 checks whether the SSL/TLS header includes another header. If another header is included (YES in step S713), the operation returns to step S706. If not (NO in step S713), the operation proceeds to step S714. This step is necessary when a single TCP packet includes a plurality of SSL/TLS messages. In step S714, the network transmitting and receiving unit 314 records a bit pattern after the last SSL/TLS header in the packet in the bit pattern in the return/proxy response information storage unit 312. Then, the operation proceeds to RETURN.

After the heartbeat automatic recognition process is executed in step S605 in FIG. 6, in step S606, the network transmitting and receiving unit 314 determines whether to cause the main control unit 200 to return from the power-saving state to the non-power-saving state. If the consecutive message number exceeds a predetermined determination consecutive message number and the network transmitting and receiving unit 314 does not transmit a reply for a certain period of time (YES in step S606), the operation proceeds to step S610. If not (NO in step S606), the operation proceeds to step S607. The consecutive message number is the consecutive response message number incremented in the heartbeat automatic recognition process. In the present exemplary embodiment, if an information processing apparatus repeatedly transmits messages of the same pattern, these messages are determined to be heartbeats. However, the determination consecutive message number for determining messages to be heartbeats is not limited. Thus, once bit patterns match, the message may be determined to be a heartbeat. Namely, a heartbeat may be determined even when the increment number is 1.

In step S610, the network transmitting and receiving unit 314 transmits an ACK packet and discards the corresponding packet. Then, in step S612, the network transmitting and receiving unit 314 increments the response message number, and the operation returns to step S601. In this way, instead of the main control unit 200, the network transmitting and receiving unit 314 in the sub control unit 210 transmits information, such as an ACK packet, in response to a message.

Thus, even when the main control unit 200 is in the non-power-saving state, the image forming apparatus 101 can respond to the message. In addition, since the main control unit 200 is not shifted from the non-power-saving state to the power-saving state, power consumption of the image forming apparatus 101 can be reduced. In addition, because of the heartbeat automatic recognition process in step S605 and the process in step S606 for determining the message to be a heartbeat using the encrypted communication protocol, a heartbeat can be determined without causing the sub control unit 210 to execute a decryption process. As a result, the cost for providing the sub control unit 210 with a function of executing the decryption process can be reduced. In step S606, if the network transmitting and receiving unit 314 determines that the image forming apparatus 101 needs to be in the non-power-saving state (NO in step S606), the operation proceeds to step S607. In step S607, the network transmitting and receiving unit 314 determines whether the main control unit 200 is in the power-saving state. If so (YES in step S607), the operation proceeds to step S608. If not (NO in step S607), the operation proceeds to step S609.

A process in step S608 for returning from the heartbeat-compatible power-saving state will be described in detail with reference to FIG. 8. In step S608, the main control unit 200 is returned from the power-saving state, as needed. In step S801, the network transmitting and receiving unit 314 causes the main control unit 200 to return from the power-saving state. In step S802, the network transmitting and receiving unit 314 checks whether a socket, on which the return process has not been executed, exists in the return/proxy response information storage unit 312. If the unprocessed socket exists (YES in step S802), the operation proceeds to step S803. If not (NO in step S802), the operation proceeds to RETURN. In step S803, the network transmitting and receiving unit 314 checks whether the response message number of the target socket is 1 or more. If the response message number is 1 or more (YES in step S803), the operation proceeds to step S804. If not (NO in step S803), the operation proceeds to step S805.

In step S804, the network transmitting and receiving unit 314 adds the response message number stored in the return/proxy response information storage unit 312 to the corresponding SSL reception message number in the main control unit 200. Namely, the main control unit 200 is notified of the number of transmissions of response information transmitted from the sub control unit 210, as the response message number. This is because the SSL/TLS message number is used in SSL/TLS hash calculation. If this process is not executed, a hash check fails when the main control unit 200 is shifted from the power-saving state. As a result, the corresponding TCP connection is discarded. In contrast, if a hash is calculated from the supplied response message number, a hash check is executed with the hash included in the message transmitted from the information processing apparatus 102. As a result, if the hash check succeeds, the message is processed by the main control unit 200, instead of being discarded. In step S805, the network transmitting and receiving unit 314 deletes the target socket information stored in the return/proxy response information storage unit 312. Then, the operation returns to step S802 again to repeat the same process for the remaining sockets.

In step S609, the network transmitting and receiving unit 314 transmits the received TCP packet to the main control unit 200 via the Sub-Main CPU communication unit 311. The TCP packet transmitted to the main control unit 200 is transmitted from the normal control unit 301 to the application protocol control unit 307, so that the TCP packet is processed by a corresponding application.

Thus, the above method enables a proxy response in response to a heartbeat encrypted by SSL/TLS and to a process requiring a similar function only with a small amount of calculation, without executing a decryption process.

In the above exemplary embodiment, in step S606, if the consecutive message number exceeds a predetermined determination consecutive message number, the network transmitting and receiving unit 314 determines that the main control unit 200 needs to be shifted from the power-saving state to the non-power-saving state. However, additionally, a condition based on a minimum time interval may be added. The minimum time interval is a minimum time period necessary for recognizing a heartbeat. Generally, heartbeats are not consecutively transmitted within a very short time period. Thus, to prevent false recognition of a heartbeat, such process may be effective.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-006206 filed Jan. 16, 2012, which is hereby incorporated by reference herein in its entirety.

What is claimed is:

1. An image forming apparatus, comprising:
   a main control unit configured to control an image forming processing unit configured to execute an image forming process; and
   a sub control unit configured to exchange data with an information processing apparatus via a network,
   wherein the main control unit includes a power-saving control unit configured to shift the main control unit to a power-saving state, in which power supply to the image forming processing unit is reduced, and
   wherein the sub control unit comprises:
   a determination unit configured to determine, if an encryption communication protocol is used for exchanging messages and a message is transmitted from the information processing apparatus, whether the main control unit needs to be shifted to a non-power-saving state from the power-saving state based on a bit pattern of the message, without executing a decryption process on the message;
   a return unit configured to give, if the determination unit determines that the main control unit needs to be shifted to the non-power-saving state, a return instruction for shifting the main control unit to the non-power-saving state, to cause the main control unit to transmit information in response to the message to the information processing apparatus; and
   a response unit configured to transmit, if the determination unit determines that the main control unit does not need to be shifted to the non-power-saving state, information in response to the transmitted message to the information processing apparatus, without giving the return instruction for shifting the main control unit to the non-power-saving state, wherein the sub control unit further comprises a storage unit configured to store a number of transmissions of response information from the response unit as a response message number, wherein, when the main control unit is shifted to the non-power-saving state, the return unit notifies the main control unit of the stored response message number, and wherein, when the main control unit is shifted from the power-saving state to the non-power-saving state, the main control unit executes a hash check on the message based on the response message number, of which the main control unit has been notified, and then, if the main control unit succeeds in the hash check, the main control unit transmits information in response to the message to the information processing apparatus.

2. The image forming apparatus according to claim 1, wherein, when the sub control unit establishes connection with the information processing apparatus, the sub control unit stores a hash size of the message and stores a pattern obtained by subtracting the stored hash size from a bit pattern of the message as a bit pattern, wherein the determination unit determines whether a pattern of a message obtained by subtracting the stored hash size from a bit pattern of a message transmitted from the information processing apparatus again matches the stored bit pattern, wherein, if the determination unit determines that the patterns match, the determination unit determines that the main control unit does not need to be shifted from the power-saving state to the non-power-saving state, and wherein, if the determination unit determines that the patterns do not match, the determination unit determines that the main control unit needs to be shifted from the power-saving state to the non-power-saving state.

3. The image forming apparatus according to claim 2, wherein the determination unit determines whether number of times when the pattern of a message transmitted from the information processing apparatus matches the stored bit pattern exceeds a predetermined determination consecutive message number, wherein, if the number of times exceeds the predetermined determination consecutive message number, the determination unit determines that the main control unit does not need to be shifted from the power-saving state to the non-power-saving state, and wherein, if the number of times falls below the predetermined determination consecutive message number, the determination unit determines that the main control unit needs to be shifted from the power-saving state to the non-power-saving state.

4. A method for controlling an image forming apparatus including a main control unit configured to control an image forming processing unit configured to execute an image forming process, and a sub control unit configured to exchange data with an information processing apparatus via a network, the method comprising:

shifting the main control unit to a power-saving state, in which power supply to the image forming processing unit is reduced;

determining, if an encryption communication protocol is used for exchanging messages and a message is transmitted from the information processing apparatus, whether the main control unit needs to be shifted to a non-power-saving state from the power-saving state by the shifting step based on a bit pattern of the message, without executing a decryption process on the message;

giving, if it is determined that the main control unit needs to be shifted to the non-power-saving state, a return instruction for shifting the main control unit to the non-power-saving state, to cause the main control unit to transmit information in response to the message to the information processing apparatus; and transmitting, if it is determined that the main control unit does not need to be shifted to the non-power-saving state, information in response to the transmitted message to the information processing apparatus, without shifting the main control unit to the non-power-saving state, wherein the sub control unit further comprises a storage unit configured to store a number of transmissions of response information transmitted by the transmitting step as a response message number, wherein, when the shifting step shifts the main control unit to the non-power-saving state, the giving step notifies the main control unit of the stored response message number, and wherein, when the shifting step shifts the main control unit from the power-saving state to the non-power-saving state, the main control unit executes a hash check on the message based on the response message number, of which the main control unit has been notified, and then, if the main control unit succeeds in the hash check, the main control unit transmits information in response to the message to the information processing apparatus.

5. A non-transitory storage medium storing a program for causing an image forming apparatus to execute a method for controlling an image forming apparatus including a main control unit configured to control an image forming processing unit configured to execute an image forming process, and a sub control unit configured to exchange data with an information processing apparatus via a network, the method comprising:

shifting the main control unit to a power-saving state, in which power supply to the image forming processing unit is reduced;

determining, if an encryption communication protocol is used for exchanging messages and a message is transmitted from the information processing apparatus, whether the main control unit needs to be shifted to a non-power-saving state from the power-saving state by the shifting step based on a bit pattern of the message, without executing a decryption process on the message;

giving, if it is determined that the main control unit needs to be shifted to the non-power-saving state, a return instruction for shifting the main control unit to the non-power-saving state, to cause the main control unit to transmit information in response to the message to the information processing apparatus; and transmitting, if it is determined that the main control unit does not need to be shifted to the non-power-saving state, information in response to the transmitted message to the information processing apparatus, without shifting the main control unit to the non-power-saving state, wherein the sub control unit further comprises a storage unit configured to store a number of transmissions of response information transmitted by the transmitting step as a response message number, wherein, when the shifting step shifts the main control unit to the non-power-saving state, the giving step notifies the main control unit of the stored response message number, and wherein, when the shifting step shifts the main control unit from the power-saving state to the non-power-saving state, the main control unit executes a hash check on the message based on the response message number, of which the main control unit has been notified, and then, if the main control unit succeeds in the hash check, the main control unit transmits information in response to the message to the information processing apparatus.

* * * * *